(12) United States Patent
Antunes et al.

(10) Patent No.: US 8,864,444 B2
(45) Date of Patent: Oct. 21, 2014

(54) TURBINE VANE WITH DUSTING HOLE AT THE BASE OF THE BLADE

(75) Inventors: Serge Louis Antunes, Combs la Ville (FR); Jacques Auguste Amedee Boury, Saint Ouen en Brie (FR); Patrice Jean-Marc Rosset, La Chapelle Gauthier (FR)

(73) Assignee: Snecma, Paris (FR)

( * ) Notice: Subject to any disclaimer, the term of this patent is extended or adjusted under 35 U.S.C. 154(b) by 635 days.

(21) Appl. No.: 13/256,358

(22) PCT Filed: Mar. 12, 2010

(86) PCT No.: PCT/EP2010/053212
§ 371 (c)(1),
(2), (4) Date: Sep. 13, 2011

(87) PCT Pub. No.: WO2010/103113
PCT Pub. Date: Sep. 16, 2010

(65) Prior Publication Data
US 2012/0014810 A1    Jan. 19, 2012

(30) Foreign Application Priority Data

Mar. 13, 2009 (FR) ...................................... 09 51615
Jun. 26, 2009 (FR) ...................................... 09 54375

(51) Int. Cl.
*F01D 5/18* (2006.01)
*F01D 5/14* (2006.01)
*F01D 9/02* (2006.01)

(52) U.S. Cl.
CPC ................. *F01D 5/18* (2013.01); *Y02T 50/673* (2013.01); *F01D 5/14* (2013.01);

(58) Field of Classification Search
CPC ............. F01D 5/14; F01D 5/143; F01D 5/18; F01D 5/186; F01D 5/187; F01D 9/02; F05D 2240/81; Y02T 50/673; Y02T 50/676; F05D 2240/80; F05D 2260/607; F05D 2260/202
USPC ..... 416/96 R, 97 R, 193 A, 248, 90 R, 121.2, 416/169.1; 415/115
See application file for complete search history.

(56) References Cited

U.S. PATENT DOCUMENTS 6,164,913 A    12/2000 Reddy
6,341,939 B1   1/2002  Lee
8,262,356 B2 * 9/2012  Ammann .................... 416/97 R
(Continued)

FOREIGN PATENT DOCUMENTS

EP    1 178 181    2/2002
EP    1 688 587    8/2006
EP    1 772 592    4/2007

OTHER PUBLICATIONS

International Search Report Issued May 12, 2010 in PCT/EP10/053212 filed Mar. 12, 2010.

*Primary Examiner* — Edward Look
*Assistant Examiner* — Jesse Prager
(74) *Attorney, Agent, or Firm* — Oblon, Spivak, McClelland, Maier & Neustadt, L.L.P.

(57) ABSTRACT

A cooled turbine vane for a turbine engine, that includes a blade mounted on a platform carried by a base, the blade including one or more cavities formed therein for cooling air circulation, the cavity extending along the trailing edge and being supplied with cooling air by a supply duct connecting an air intake located in a lower portion of the base and the cavity of the trailing edge by defining a bend within the base. The duct includes, on an axis substantially radial relative to the air intake a bell-shaped niche located under the platform, the niche being open at a top thereof via a dusting hole extending through the platform and being defined at a foot of the base by walls extending substantially radially from the platform to close the platform laterally.

14 Claims, 4 Drawing Sheets

(52) U.S. Cl.
CPC ....... *F05D 2240/80* (2013.01); *F05D 2260/202* (2013.01); *F05D 2260/607* (2013.01); *F01D 5/187* (2013.01); *F01D 5/143* (2013.01); *F01D 9/02* (2013.01); *Y02T 50/676* (2013.01); *F05D 2240/81* (2013.01); *F01D 5/186* (2013.01)
USPC .... 415/115; 415/169.1; 416/97 R; 416/193 A

(56) References Cited

U.S. PATENT DOCUMENTS

| | | |
|---|---|---|
| 2006/0153681 A1 | 7/2006 | Lee et al. |
| 2007/0020100 A1 | 1/2007 | Beeck et al. |
| 2007/0077144 A1 | 4/2007 | Lee et al. |

* cited by examiner

TURBINE VANE WITH DUSTING HOLE AT THE BASE OF THE BLADE

The field of the present invention is that of turbomachines and, in particular, that of cooled turbine vanes for these turbomachines.

BACKGROUND OF THE INVENTION

Modern turbomachines are conventionally produced in the form of an assembled collection of modules. They first of all comprise one or more compressor modules arranged in series and which compress air drawn into an air inlet. The air is then let into a combustion chamber where it is mixed with a fuel and burnt. The combustion gases pass through one or more turbine modules which drive the compressor or compressors. The gases are finally discharged either into a jet pipe nozzle to produce a propulsive force or onto a free turbine to produce power which is recovered on a transmission shaft.

These modern turbomachines, because of the high temperatures of the gases leaving the combustion chamber, are cooled, which means to say that a fresh-air ventilation circuit is installed in order to cool the metal of the turbine vanes when the turbomachine is operating. The ventilation air is bled off the outlet side of the compressor stages and conveyed to the turbine. The air generally enters via the root of the vanes, passes through these vanes via cavities cut into the thickness of the blade and is then discharged through perforations made in the wall or tip of the vanes. The cavities are formed longitudinally inside the vanes, extending between the root and the tip of the vane, so as to carry this air and cool the metal. In general, several cavities are positioned one beside the other along the chord of the vane, so as to equalize the flow rates and cool the metal uniformly.

Various types of dust (particularly fine sand) may be drawn into the air intake at the same time as the air needed for the operation of the engine. While most of the dust passes through the engine without causing any damage, some of it reaches the turbine vane cooling circuits; if it builds up inside these circuits there is then the risk of it blocking the cavity outlet discharge orifices and thus endangering the integrity of the vane. To prevent this from occurring, turbine vanes are equipped with calibrated dusting holes in addition to the cooling drillings and vents, these dusting holes being situated at the tops of the cavities and having the role of removing the dust.

Dusting holes are installed for each of the cavities. The sizing of the hole is dictated by criteria concerned with the size of the dust and is therefore independent of the overall size of the vanes. Installing a dusting hole in the case of a small-sized vane proves to be particularly tricky and may become a decisive factor in the sizing of the circuit because it is likely to govern the thermal performance of the cooling circuit.

The problem that has to be addressed is a particularly acute one in the case of a high pressure (HP) turbine vane the size of which is very small and in which the cavity that cools the trailing edge is of very slender thickness. Installing the trailing edge cavity dusting hole on a short-chord vane may lead to an abnormal increase in the size of this one cavity at the expense of the others. The trailing edge cavity may in such instances represent 25% of the total chord length whereas it usually represents only 15 to 20% on larger vanes. That means that small-sized vanes that have this type of dusting hole will require more cold air to cool them via the trailing edge cavity, at the expense of the cooling using the other cavities. It is therefore important to be able to reduce the cross section of the trailing edge cavity so as to reduce its cooling flow rate and thus be able to maintain a satisfactory overall thermal performance. The problem that has to be addressed in order to achieve this objective is that of finding a way of removing the dust from the trailing edge cavity without installing the dusting hole in the tip of the vane.

It is an object of the present invention to solve these problems by proposing a turbine vane that does not have some of the disadvantages of the prior art and that, in particular, has no trailing edge cavity dusting hole situated in the vane tip. Another object of the invention is to optimize the use of the dusting air, by making it contribute to the cooling of the vane.

BRIEF SUMMARY OF THE INVENTION

To this end, one subject of the invention is a cooled turbine vane for a turbomachine comprising a blade mounted on a platform supported by a root, said blade having one or more cavities cut into it for the circulation of cooling air, the cavity extending along the trailing edge being supplied with cooling air by a supply duct connecting an air inlet situated in the lower part of the root to the trailing edge cavity, making a bend within said root, characterized in that the duct comprises, along an axis that is substantially radial with respect to the air inlet, a niche situated under the platform and in the shape of a bell, said niche opening at its top via a dusting hole that passes through said platform and being delimited inside the root by walls extending substantially radially from the platform in order to close it laterally.

The bell shape and the fact that the niche is positioned facing the air inlet allows this niche to act as a particle trap trapping particles that might arrive with the cooling air and that would enter the vane trailing edge cooling circuit. These particles are then removed via the perforation, which is sized according to the predicted size of these particles.

In one particular embodiment, the turbine vane further comprises at least one ventilation perforation for ventilating the platform, the perforation being supplied with cooling air from the supply duct and the dusting hole coincides with said ventilation perforation of the platform.

This then reduces the number of operations involved in producing the vane.

For preference, at least one of the walls of said niche extending radially from the platform is situated in the continuation of one of the walls of the duct.

More preferably still, said niche is formed by the walls of the duct and by a ridge positioned across the direction in which the cooling air flows in said duct. This shape is particularly well suited to producing the vane by casting.

In an alternative form of the invention, the dusting hole is extended by a recess made in the external face of the platform and having a substantially triangular shape when viewed from above. This arrangement means that the air passing through the dusting hole can be made to contribute to the cooling of the connection between the platform and the blade.

For preference, the recess extends from a top positioned on the dusting hole and widens toward the connection between the platform and the blade.

In one particular embodiment of this alternative form, the side of the triangle opposite the dusting hole has a length varying between 1.5 and 3 times the diameter of the dusting hole.

Advantageously, the two sides extending from the dusting hole have a length of between 6 and 15 times the diameter of said hole.

For preference, the median axis of the recess runs in a direction substantially parallel to the edge of the platform which is situated on the trailing edge side of the vane. More preferably still, the recess diverges from the direction of said edge of the platform by 5° at most.

In one particular embodiment, the recess in its median part is substantially in the form of an inclined plane which is embedded in the thickness H of the platform in the direction of the dusting hole over a depth h of between 50 and 80% of the value of H.

For preference, said inclined plane is inclined by an angle of between 3 and 10° with respect to the plane of the platform.

The invention also relates to a turbine module of a turbomachine comprising at least one vane as defined hereinabove or to a turbomachine comprising such a turbine module.

The invention will be better understood, and further objects, details, features and advantages thereof will become more clearly apparent during the course of the detailed explanatory description that follows, of one embodiment of the invention given by way of purely illustrative and nonlimiting example and with reference to the attached schematic drawings.

DETAILED DESCRIPTION OF THE INVENTION

Figure 1:
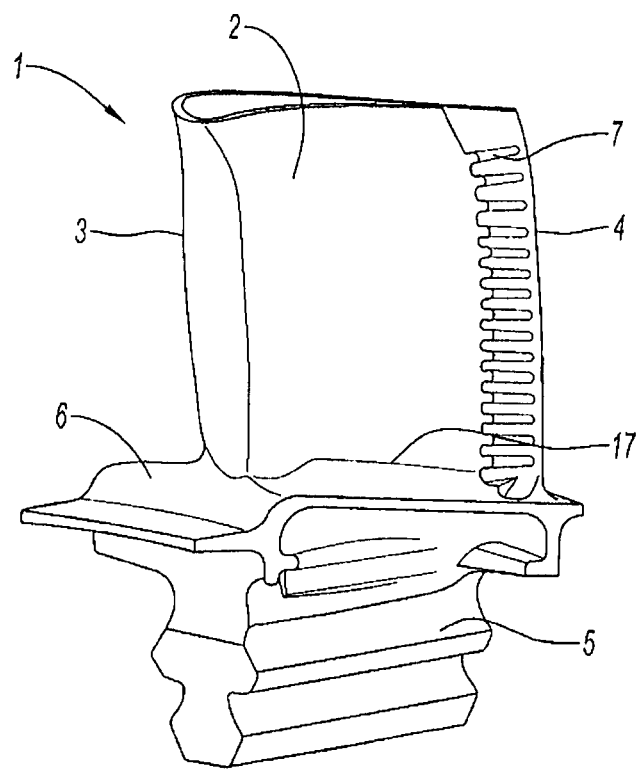
FIG. 1 is a perspective view of an HP turbine vane.
Figure 2:
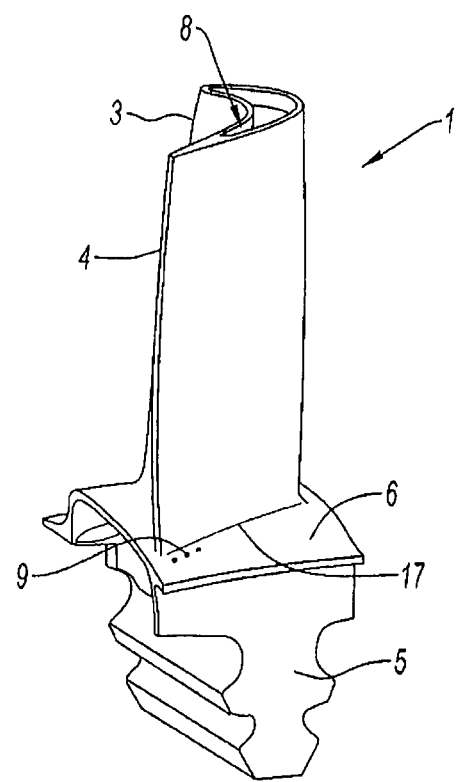
FIG. 2 is a perspective view of an HP turbine vane, showing a trailing edge cavity dusting hole positioned as per the prior art.

Reference is made to FIG. 1 which shows an HP turbine vane 1 comprising a blade 2 extending between a leading edge 3 and a trailing edge 4, mounted on a platform 6 supported by a vane root 5; the platform 6 is connected to the blade 2 by a blend radius 17 of rounded shape. The vane 1 at its trailing edge 4 has vents 7 intended to discharge the cooling air circulating within the trailing edge cavity. FIG. 2 shows the position, in the prior art, of a perforation 8 acting as a dusting hole for the trailing edge cavity; the hole 8 is positioned on the tip of the vane at this cavity. The vane 1 also comprises perforations 9 on its platform 6, on the suction face side of the blade 2, through which perforations air from the root of the blade 5 passes and which perforations have the function of cooling the vane 1 at its connection 17 between the blade 2 and the platform 6. The perforations 9 depicted in FIG. 2 are positioned at the trailing edge 4 and fed with air bled off the trailing edge cavity fresh air supply duct.

Figure 3:
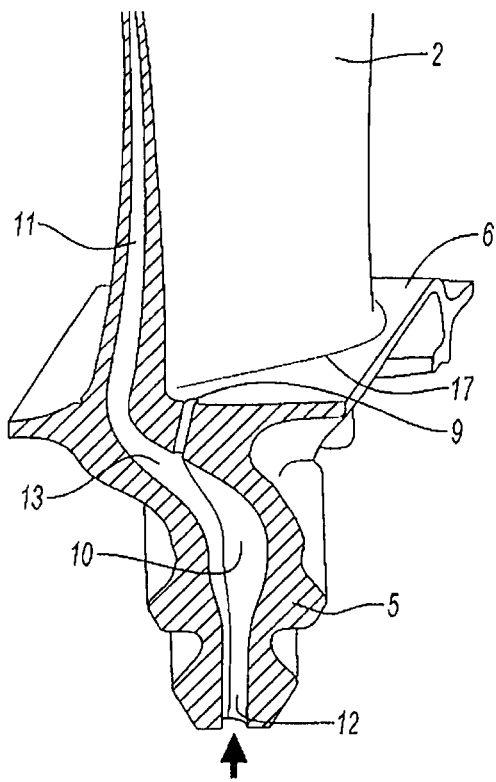
FIG. 3 is a perspective view of an HP turbine vane according to the prior art, with a cross section taken through the trailing edge cavity.
Figure 4:
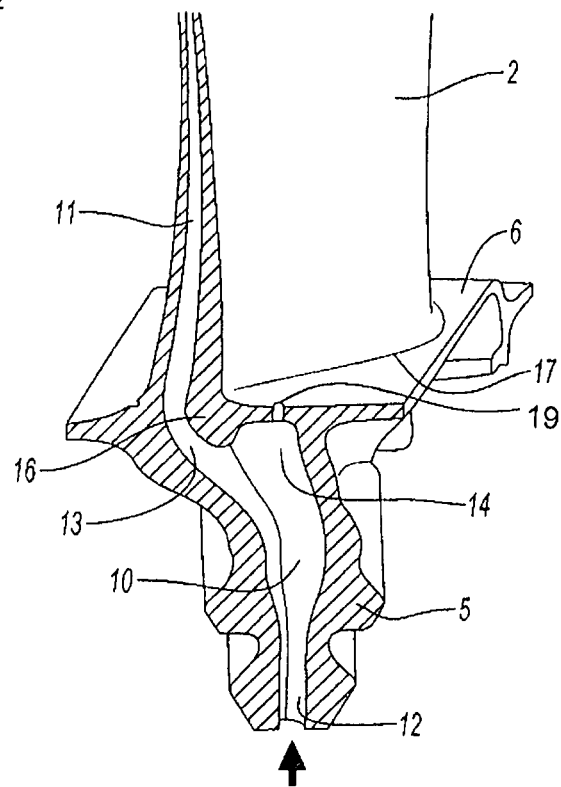
FIG. 4 is a perspective view of an HP turbine vane showing a dusting hole according to one embodiment of the invention, with a cross section taken through the trailing edge cavity.

FIGS. 3 and 4 each show a cross section of a turbine vane 1 in the region of the duct 10 that supplies cooling air to the trailing edge cavity 11 thereof. In FIG. 3, which represents the prior art, the duct 10 runs from the air inlet 12 situated in the root 5 of the vane as far as its entry into the cavity 11 maintaining a bore section that is substantially constant or alternatively that decreases very gradually in order to take account of the cooling flows tapped from it. It conventionally has a shape with a bend 13, because it connects the air inlet 12 which is situated in the plane of symmetry of the root 5 to the trailing edge cavity 11 which is for its part offset from this plane because of the curved shape of the vane 1.

In FIG. 4, according to the invention, the duct 10 widens from the suction face side of the vane 1 to form a niche 14 positioned under the platform 6 and supplied by the duct 10 and which opens into the stream via a perforation 9 that acts as a dusting hole. This niche 14 is situated substantially along the axis of the air inlet 12 and is in the form of a bell-shaped cavity the roof of which is formed by the lower wall of the platform 6, which is centered on the dusting hole 19 and which has lateral walls dropping down on each side of the dusting hole 19 to close it laterally. The diameter of the dusting hole 19 is sized to allow through any dust that is likely to reach that far.

The niche 14 is essentially created by a diversion of the walls of the cooling duct 10 which diverge more than in the prior art away from the suction face side of the blade 2 to form a space under the platform 6, and by a ridge 16, positioned across the direction in which the air circulates, in order to close off this space laterally. Such a configuration is in fact relatively easy to cast during the manufacture of the vane.

Figure 5:
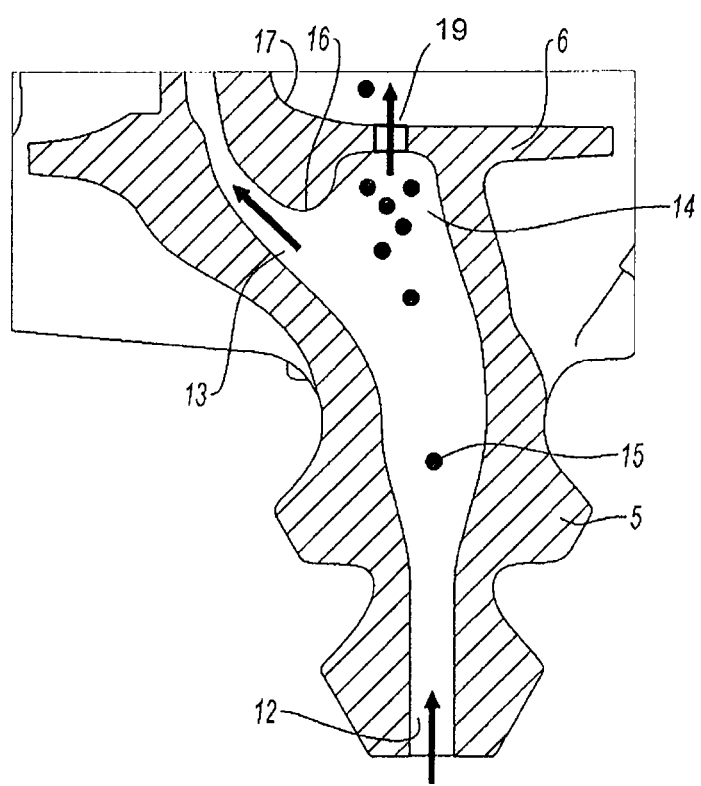
FIG. 5 is a view in a cross section of the trailing edge cavity of an HP turbine vane showing a dusting hole according to the same embodiment of the invention.

FIG. 5 is a cross section of the circulation of air through the duct 10 and the path followed by the particles of dust 15 that enter the trailing edge 4 cooling circuit of the vane 1.

It can be seen from FIGS. 3 and 4 that because the niche 14 is created under the platform 6 and has to be aligned with the air inlet orifice 12, the dusting hole 19 (FIG. 4) is located a greater distance away from the blend radius 17 than were the cooling perforations 9 in the prior art (FIG. 3). The latter opened at the point at which this radius 17 met the platform 6, whereas the dusting hole 19 is set away from this point somewhat. If the dusting hole 19 were to take the place of the perforations 9, this could then result in poorer cooling of this blend region.

Figure 6:
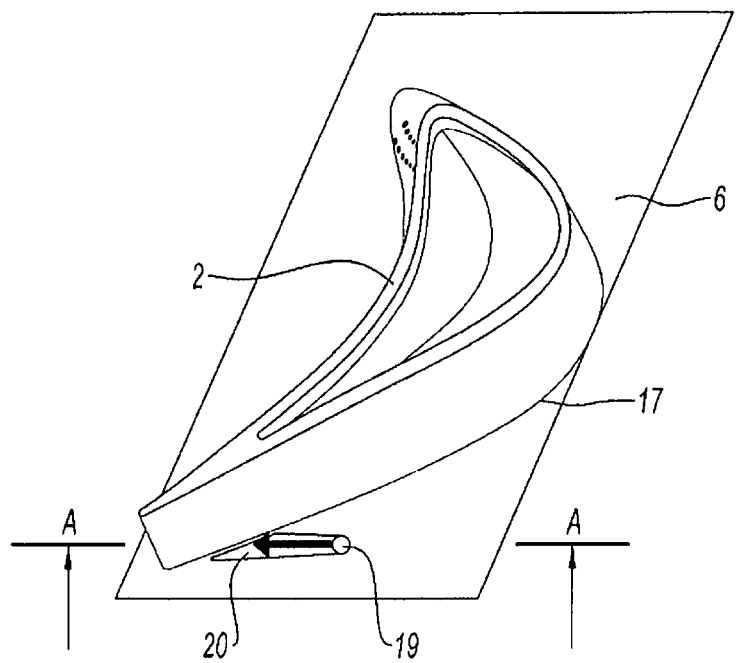
FIG. 6 is a view from above of a platform of a turbine vane showing an alternative form of dusting hole according to the invention.

In order to remedy this and maintain just one perforation for cooling the blend radius 17, FIG. 6 shows an alternative for the bottom part of a vane 1, with the platform 6 into which the dusting hole 19 opens. This hole is extended by a recess 20, made in the thickness of the platform, on the outside thereof (which means on the side furthest from the axis of rotation of the engine) and which, when viewed from above, is substantially triangular in shape. The corresponding triangle extends from a vertex positioned on the dusting hole 19 and widens towards the connection 17 between the platform 6 and the blade 2. In a preferred embodiment, the side opposite the dusting hole 19 has a length varying between 1.5 and three times the diameter of the dusting hole 19, while the other two sides are between 6 and 15 times this same diameter in length.

Figure 7:
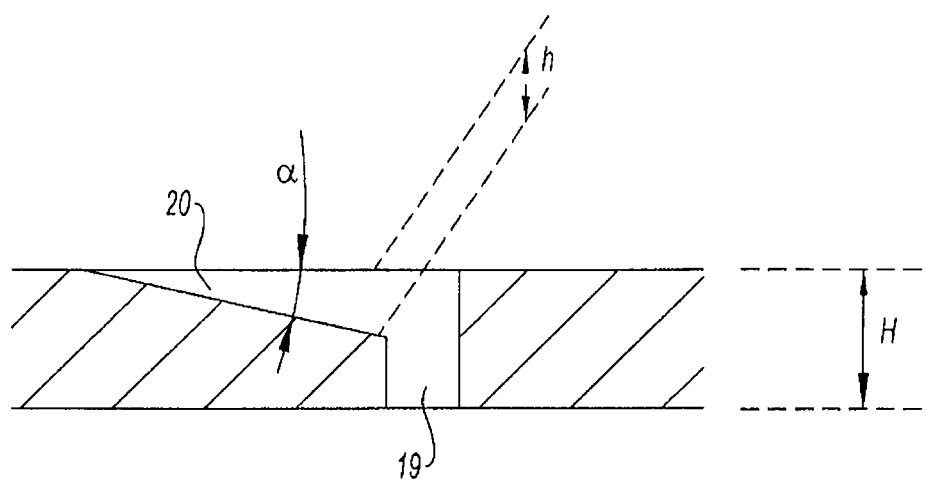
FIG. 7 is a view in cross section of a platform of a turbine vane showing the shape of the outlet orifice of the same alternative form of a dusting hole according to the invention.

FIG. 7 shows a view of the recess 20 in cross section on a direction A-A, as illustrated in FIG. 6, substantially parallel to that edge of the platform that is situated on the trailing edge side of the vane. The dusting hole 19, as previously indicated, passes through the entire thickness H of the platform 6 and in its median part the recess 20 has the form of an inclined plane which is embedded into this thickness H. It meets the dusting hole 19 at a depth h of between 50 and 80% of the value of H and is inclined with respect to the plane of the platform by an angle that can vary from 3 to 10°. In the direction transverse to the cross section A-A, the recess 20 has the shape of a U or V which connects it to the plane of the platform 6 along the two long sides of the triangle.

The median axis of the triangle constituting the recess 20 is situated in the direction of the flow lines of the stream of gas and for that reason can diverge from the direction of the edge of the platform situated on the trailing edge side of the vane by plus or minus 5°.

The cooling of the trailing edge 4 of a vane 1 according to the invention will now be described.

The cooling air reaches the root 5 of the vane 1 and enters the cavity 11 supply circuit via the inlet duct 12 in order to cool the trailing edge 4. Particles of dust 15 are mixed with this air and these need to be eliminated to prevent them from blocking the cooling orifices and disrupting the cooling of certain parts of the vane.

The air enters the inside of the vane 1 under pressure and carries the particles 15 along with it. These particles, because of the rotation of the vanes and of the centrifugal force thus generated, shift radially in the cooling duct 10 and migrate toward the niche 14, positioned for this purpose facing the air inlet 12. Unlike in the prior art, they do not follow the bend 13 of the duct 10 and remain temporarily below the platform 6, trapped by the lateral walls of the niche 14. They accumulate under the roof of this niche and thus find themselves positioned facing the perforation 19, which acts as a dusting hole. The particles 15 are then carried along in the flow of air passing through the dusting hole 19 and are ejected into the engine gas stream. Because dusting is performed at the perforation 19, there is no longer any need to drill a hole in the tip of the cavity 11 of the vane 1 in order to perform this function; this then avoids a drilling operation which, as already indicated, was very tricky to perform in the prior art. In the alternative form depicted in FIGS. 6 and 7, the cooling air that passes through the dusting hole 19 is diverted as it leaves, in the region of the platform 6, by the recess 20 and takes the direction substantially parallel to this platform. What is more, it is held tightly against the surface of the platform by the gases flowing in the engine stream which carry it toward the blend radius 17. The air passing through the dusting hole 19 and which, as a result, is diverted from the vane cooling circuit in order to perform this dusting function, thus still gets used to cool this vane, but this time, at the root thereof.

Because the diameter of the dusting hole 19 is greater than that of the perforations 9 of the prior art because it is sized to allow the particles of dust to pass through it, the air flow rate that passes through it is greater than the cooling flow rate which was passing through the perforations 9. As a result, firstly of the fact that this air flow rate is greater and, secondly, of the triangular shape of the recess 20, the air leaving the dusting hole 19 sweeps over the blend radius 17 over a certain length. Its thermal efficiency is therefore similar to that of the three perforations 9 in the platform that are found in the prior art and it is possible to dispense with these holes. The improvement achieved in this alternative is therefore twofold, in that the operation of drilling the three holes is avoided and the flow rate of cooling air passing through the trailing edge cavity can be reduced overall. This is because the dusting air in fact performs the functions previously performed by the dusting hole 8 and the functions performed by the cooling perforations 9 for cooling the blade-platform connection 17.

Although the invention has been described in conjunction with two particular embodiments, it is quite obvious that it is not in any way restricted thereto and that it comprises all technical equivalents of the means described and combination thereof where these fall within the scope of the invention.

The invention claimed is:

1. A cooled turbine vane for a turbomachine comprising:
a blade mounted on a platform supported by a root, the blade including one or more cavities cut into it for circulation of cooling air, the cavity extending along a trailing edge being supplied with cooling air by a supply duct connecting an air inlet situated in a lower part of the root to the trailing edge cavity, making a bend within the root;
wherein the duct comprises, along an axis that is substantially radial with respect to the air inlet, a niche situated under the platform and in a shape of a bell, the niche opening at its top via a dusting hole that passes through the platform and being delimited inside the root by walls extending substantially radially from the platform to close the platform laterally.

2. The turbine vane as claimed in claim 1, further comprising at least one ventilation perforation for ventilating the platform, the perforation being supplied with cooling air from the supply duct, wherein the dusting hole coincides with the ventilation perforation of the platform.

3. The turbine vane as claimed in claim 1, in which at least one of the walls of the niche extending radially from the platform is situated in continuation of one of walls of the duct.

4. The turbine vane as claimed in claim 3, in which the niche is formed by the walls of the duct and by a ridge positioned across the direction in which the cooling air flows in the duct.

5. The turbine vane as claimed in claim 1, in which the dusting hole is extended by a recess made in an external face of the platform and having a substantially triangular shape when viewed from above.

6. The turbine vane as claimed in claim 5, in which the recess extends from a top positioned on the dusting hole and widens toward a connection between the platform and the blade.

7. The turbine vane as claimed in claim 6, in which a side of the triangle opposite the dusting hole has a length varying between 1.5 and 3 times the diameter of the dusting hole.

8. The turbine vane as claimed in claim 6, in which two sides extending from the dusting hole have a length of between 6 and 15 times the diameter of the hole.

9. The turbine vane as claimed in claims 5, in which the median axis of the recess runs in a direction substantially parallel to an edge of the platform which is situated on the trailing edge side of the vane.

10. The turbine vane as claimed in claim 9, in which the median axis of the recess diverges from a direction of the edge of the platform by 5° at most.

11. The turbine vane as claimed in claim 5, in which the recess in its median part is substantially in a form of an inclined plane that sinks in thickness H of the platform in the direction of the dusting hole over a depth h of between 50% and 80% of the value of H.

12. The turbine vane as claimed in claim 11, in which the inclined plane is inclined by an angle of between 3° and 10° with respect to the plane of the platform.

13. A turbine module of a turbomachine comprising at least one vane as claimed in claim 1.

14. A turbomachine comprising a turbine module as claimed in claim 13.

* * * * *